US011045899B2

(12) United States Patent
Kleinert (10) Patent No.: US 11,045,899 B2
(45) Date of Patent: Jun. 29, 2021

(54) PHASED ARRAY STEERING FOR LASER BEAM POSITIONING SYSTEMS

(71) Applicant: Electro Scientific Industries, Inc., Portland, OR (US)

(72) Inventor: Jan Kleinert, Portland, OR (US)

(73) Assignee: Electro Scientific Industries, Inc., Beaverton, OR (US)

( * ) Notice: Subject to any disclaimer, the term of this patent is extended or adjusted under 35 U.S.C. 154(b) by 602 days.

(21) Appl. No.: 15/691,344

(22) Filed: Aug. 30, 2017

(65) Prior Publication Data

US 2017/0361398 A1     Dec. 21, 2017

Related U.S. Application Data

(62) Division of application No. 14/214,649, filed on Mar. 14, 2014.

(51) Int. Cl.
| | | |
|---|---|---|
| *B23K 26/03* | (2006.01) | |
| *H01S 3/067* | (2006.01) | |
| *H01S 3/10* | (2006.01) | |
| *B23K 26/035* | (2014.01) | |
| *B23K 26/067* | (2006.01) | |
| *H01S 3/00* | (2006.01) | |

(52) U.S. Cl.
CPC ............. *B23K 26/03* (2013.01); *B23K 26/035* (2015.10); *B23K 26/0676* (2013.01); *H01S 3/06754* (2013.01); *H01S 3/10053* (2013.01); *H01S 3/005* (2013.01); *H01S 3/0071* (2013.01); *H01S 3/06737* (2013.01); *H01S 3/06741* (2013.01); *H01S 3/1003* (2013.01); *Y10T 29/49165* (2015.01)

(58) Field of Classification Search
CPC .. B23K 26/03; B23K 26/035; B23K 26/0676; H01S 3/005; H01S 3/0071; H01S 3/06737; H01S 3/06741; H01S 3/06754; H01S 3/1003; H01S 3/10053; H01S 3/10097; H01S 3/1001; H01S 3/10015; H01S 3/10023; H01S 3/13; Y10T 29/49165
USPC ................ 219/121.6, 121.61, 121.77–121.8
See application file for complete search history.

(56) References Cited

U.S. PATENT DOCUMENTS

| | | | |
|---|---|---|---|
| 5,751,585 | A | 5/1998 | Cutler et al. |
| 5,798,927 | A | 8/1998 | Cutler et al. |
| 6,678,294 | B1 | 1/2004 | Komine et al. |

(Continued)

FOREIGN PATENT DOCUMENTS

| | | |
|---|---|---|
| CN | 101939880 A | 1/2011 |
| CN | 102245341 A | 11/2011 |

(Continued)

OTHER PUBLICATIONS

The Taiwan office action dated Feb. 13, concerning Taiwanese Patent Application No. 103109596. 10 pages.

(Continued)

*Primary Examiner* — Justin C Dodson (57) ABSTRACT

A laser beam positioning system of a laser-based specimen processing system produces at beam positioner stage, from a fully fiber-coupled optics phased array laser beam steering system, a steered laser input beam. System directs beam through one or more other beam positioner stages to form a processing laser beam that processes target features of a workpiece mounted on a support.

13 Claims, 5 Drawing Sheets

(56) References Cited

U.S. PATENT DOCUMENTS

| | | | |
|---|---|---|---|
| 6,706,999 | B1 | 3/2004 | Barrett et al. |
| 6,708,003 | B1 | 3/2004 | Wickham et al. |
| 8,680,430 | B2 | 3/2014 | Unrath |
| 2001/0013510 | A1* | 8/2001 | Wiener-Avnear ............................ H01L 27/14683 219/121.69 |
| 2006/0219673 | A1* | 10/2006 | Varnham ............ B23K 26/0734 219/121.6 |
| 2008/0080570 | A1* | 4/2008 | Murison ............. H01S 3/06754 372/20 |
| 2008/0084598 | A1* | 4/2008 | Rothenberg ....... B23K 26/0613 359/238 |
| 2008/0299783 | A1* | 12/2008 | Bruland ............... B23K 26/082 438/795 |
| 2009/0046340 | A1* | 2/2009 | Reimer .................. G02B 26/06 359/196.1 |
| 2009/0114629 | A1* | 5/2009 | Gross ................. B23K 26/0676 219/121.77 |
| 2009/0154503 | A1 | 6/2009 | Peyghambarian et al. |
| 2009/0201575 | A1* | 8/2009 | Fermann ............. H01S 3/06745 359/341.32 |
| 2010/0059490 | A1* | 3/2010 | Unrath ................. B23K 26/066 219/121.73 |
| 2010/0140237 | A1* | 6/2010 | Unrath ................. B23K 26/382 219/121.72 |
| 2010/0291760 | A1 | 11/2010 | Doudoumopoulos et al. |
| 2010/0301024 | A1* | 12/2010 | Unrath ................. B23K 26/046 219/121.67 |

FOREIGN PATENT DOCUMENTS

| | | | |
|---|---|---|---|
| JP | 2005-74479 | A | 3/2005 |
| JP | 2009-048021 | A | 3/2009 |
| JP | 2011-512653 | A | 4/2011 |
| JP | 2012-510901 | A | 5/2012 |
| TW | 201107068 | A | 3/2011 |

OTHER PUBLICATIONS

The International Search Report of PCT/US2014/029470, 3 pages.
The Written Opinion, dated Sep. 15, 2015, concerning PCT Patent Application No. PCT/US2014/029470, 2 pages.
The European search report, dated Jan. 5, 2017, concerning European Patent Application No. 14762412, which is correspondence to this U.S. Appl. No. 14/214,649. 12 pages.
Zhang, Xiaofei et al., "Beam Steering by Phase Control Based on Lithium Niobate in Laser-Phased-Array", International symposium on Photoelectronic detection and imaging 2011: Laser sensing and imaging; and biological and medical applications of photonics sensing image, SPIE, 1000 20th St. Bellingham WA 98225-6705 USA, vol. 8192, No. 1, Jun. 9, 2011, pp. 1-6.
Wang, Chun-can et al., "Photonic Crystal Fiber for Fundamental Mode Operation of Multicore Fiber Lasers and Amplifiers" Optics Communications, Elsevier, Amsterdam, NL, vol. 281, No. 21, Nov. 1, 2008, pp. 5364-5371.
Leading the 3D light revolution, 3D Optofan Series, 2014, Optoscribe Ltd., Livingston, West Lothian, UK.
Fang, Xiao-Hui, et al. "Generation of 150 MW, 110 fs pulses by phase-locked amplification in multicore photonic crystal fiber," Optical Society of America, Optics Letter, Jul. 15, 2010, pp. 2326-2328, vol. 35, No. 14.
Doylend, J.K., et al., "Hybrid III/V silicon photonic source with integrated 1D free-space beam steering," Optical Society of America, Optics Letter, Oct. 15, 2012, pp. 4257-4259, vol. 37, No. 20.
Huang, W. Ronny, et al., "High speed, high power one-dimensional beam steering from a 6-element optical phased array," Optics Express, Jul. 30, 2012, pp. 17311-17318, vol. 20, No. 6.
McManamon, Paul F., et al., "A Review of Phased Array Steering for Narrow-Band Electrooptical Systems," Proceedings of the IEEE, Jun. 6, 2009, pp. 1078-1096, vol. 97, No. 6.
The Japanese office action dated Feb. 6, concerning Japanese Patent Application No. 2016-503108. 3 pages.
The Chinese office action dated Feb. 2, concerning Chinese Patent Application No. 201480015621.5. 12 pages.

* cited by examiner

PHASED ARRAY STEERING FOR LASER BEAM POSITIONING SYSTEMS

CROSS-REFERENCE TO RELATED APPLICATIONS

This application is a divisional of prior application Ser. No. 14/214,649, filed Mar. 14, 2014, which claims the benefit of U.S. Provisional Application No. 61/789,580, filed Mar. 15, 2013, the contents of each of which is herein incorporated by reference in its entirety for all purposes.

COPYRIGHT NOTICE

© 2017 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

TECHNICAL FIELD

This disclosure relates to laser processing workpiece features and, in particular, to phased array steering for high-power laser micromachining systems.

BACKGROUND INFORMATION

Certain laser processing applications perform processing of a regularly spaced pattern of target locations on a workpiece. For instance, certain solar cell processing applications involve drilling vias through the silicon wafer in a regularly spaced grid pattern. Customers for these applications seek very high processing throughput, on the order of several thousand vias per second.

The spacing of vias in these applications is fairly dense, on the order of 0.25-1 mm. The overall processed area is significant, typically 150×150 mm square wafers. Therefore, the laser processing system processes this area by rapidly drilling the tight-pitch vias. The accuracy of such systems is on the order of 3-20 µm. The drill time for each via depends on laser characteristics (wavelength, pulse frequency, pulse power, and pulse width), via diameter, and substrate material and thickness. The drill time is, however, typically on the order of 0.1-0.5 msec. Via diameters are typically on the order of 15-50 µm.

Typical conventional processing system approaches rely on galvanometer (galvo)-based positioning of the laser processing beam, either alone (using a very large galvo field), or optionally combined with a secondary movable stage (and thereby permitting a relatively small galvo field). More recently, a tertiary acousto-optic deflector (AOD) stage has been implemented. It is noted, however, that these primary, secondary, and tertiary beam steering approaches have certain limitations.

A first system architecture implementing galvo-based processing laser beam positioning uses a single large galvo field to cover the entire workpiece. This implementation uses either a very large scan lens or a post-lens scanning system. In either case, the galvo typically moves the processing beam at a constant velocity over the entire workpiece, and a controller fires a laser pulse at each via location without stopping the galvo. A relatively small number of pulses are used for each via, so several processing passes are made to fully drill each via. Accordingly, a regularly spaced pattern of target via locations improves processing times. This approach avoids the timing overhead and thermal effects of frequent galvo acceleration and deceleration, because galvo turnarounds take place only at the edges of the workpiece. The measure of the angular deflection range at which the laser spot (or simply, spot) at the workpiece surface is not too distorted by the free-space optics and stays in focus is typically between 1,000 and 10,000 spot widths (or simply, spots) across one axis of scanning.

If a very large scan lens is used to cover the entire workpiece field, the large lens is subject to accuracy degradation caused by optics heating that results from working with high-powered laser beams. The large lens also uses a large beam diameter to obtain the desired workpiece surface spot size. Such large beam diameters use large galvos, which in turn suffer from accuracy effects resulting from the lower thermal efficiency of moving large (high-inertia) mirrors with large (high-inertia) galvos.

If a post-lens scanning system is used to cover the entire workpiece field, the lens thermal accuracy effects are reduced. The processing system suffers, however, from the effects of non-telecentric beam delivery, which degrades the quality of the drilled vias. Moreover, reducing such telecentric errors can be achieved by maintaining a long focal length, which would entail using a large beam diameter to obtain the desired workpiece surface spot size. This leads to thermal accuracy issues similar to those described above because of the large galvos employed in such systems. If telecentric errors are not of significance, one can use a shorter FL lens and avoid the non-flat focus field problem by using a dynamic focus element. Disadvantages of this approach include cost; complexity; inaccuracy contribution by the focus element; cost of the focus element for very high-speed applications; and residual telecentric error.

A second system architecture is a compound positioning system, in which a small galvo field (typically about 20 mm square) is implemented in conjunction with a structural mechanism that moves a galvo head over the workpiece (either through an X-Y workpiece table, or by a cross-axis moveable optics configuration). As in the first system architecture, the galvo may scan over the vias at a constant velocity, pulsing the processing laser beam at each via, to avoid the overhead of stopping at each via location. As the galvo rapidly scans over its field, the galvo spends a significant amount of time accelerating and decelerating at the edges of the scan field because it is significantly smaller than the workpiece. This expenditure of time causes a significant reduction in throughput, and if high acceleration is used to reduce the turnaround time, thermal heating of the galvo degrades accuracy and places an upper limit on achievable acceleration. However, the second system architecture does have the advantage of higher accuracy (resulting from reduced lens distortion with the smaller scan lens), improved via quality (resulting from the smaller, lower-distortion scan lens, and the telecentric scan field), and potentially high beam positioning speed (resulting from small galvos and mirrors). Yet this approach may be infeasible because of the throughput limitation described above, depending on the number of laser pulses used to process each via.

AODs in a tertiary beam position stage have a bandwidth (about 1 MHz) that is close to three orders of magnitude larger than that of galvos (about 2.5 kHz). Therefore, AODs enable error correction for the galvos as well as very fast beam steering within their range of deflection (approximately 10 to 50 spots). But state of the art lasers (and even more so for experimental lasers currently being developed)

provide increasingly higher powers at increasingly faster repetition rates (e.g., from ones of MHz to hundreds of MHz). Also, some lasers can readily further scale power by increasing repetition rates well beyond 1 MHz and can thereby reach maximum average powers at 1.6 MHz and above. These bandwidths exceed a tertiary beam positioning system's capability to fully spatially separate each pulse from its neighboring pulses. Fully separated pulses are used by many processes in the laser-micromachining domain because, if pulses partly overlap, the following two negative effects take place: local heat accumulation negates the beneficial effects of a-thermal ablation provided by ultrafast lasers, and there is pulse-plume interaction.

SUMMARY

An apparatus for directing a laser beam toward a target location on a workpiece in response to a position command, incudes: a low-bandwidth positioner stage directing at least one of the workpiece and the laser beam relative to one another in response to a low-frequency portion of the position command; a mid-bandwidth positioner stage directing at least one of the workpiece and the laser beam relative to one another in response to a mid-frequency portion of the position command; and a high-bandwidth positioner stage including a phase modulator array configured for phased array steering of the laser beam relative to the workpiece in response to a high-frequency portion of the position command.

A method for directing a laser beam for processing a target location on a workpiece in response to a position command, entails: directing at least one of the workpiece and the laser beam relative to one another in response to a low-frequency portion of the position command; directing at least one of the workpiece and the laser beam relative to one another in response to a mid-frequency portion of the position command; and phased array steering, with a phase modulator array, the laser beam relative to the workpiece in response to a high-frequency portion of the position command.

A method of accomplishing high-throughput laser processing of workpiece features arranged in a densely spaced pattern while minimizing workpiece feature processing inaccuracy and quality degradation that result from dynamic and thermal loads on laser beam positioning and optical components directing the laser beam during workpiece feature processing, includes positioning a workpiece on a support, the workpiece having a process surface that defines a process surface area; directing a laser beam to a beam positioning system to provide a processing laser beam for incidence at feature locations on the process surface of the workpiece, the beam positioning system including a movable stage and first and second beam positioners that cooperate with the movable stage to process in a densely spaced pattern workpiece features at the feature locations on the process surface of the workpiece, the first beam positioner having a first response time and operable to position the processing laser beam within a scan field region of the process surface, and the second beam positioner including a phase modulator array having a second response time and operable to phased array steer the processing beam to locations within the scan field region, the second response time being shorter than the first response time; and coordinating operation of the movable stage, the first beam positioner, and the second beam positioner to position the processing laser beam within the scan field region and move the scan field region to cover the process surface.

Additional aspects and advantages will be apparent from the following detailed description of embodiments, which proceeds with reference to the accompanying drawings.

DETAILED DESCRIPTION OF EMBODIMENTS

An AOD's speed is fundamentally limited by acoustic velocity. This constraint limits current AODs to bandwidths of about 1 MHz, much like galvos are limited to about 2.5 kHz bandwidths. The ~1 MHz bandwidth enables single spot placement control for Q-switched lasers operating at sub 1 MHz (typically below 500 kHz) repetition rates, but diode seed modulated and mode locked lasers are operable in the tens of MHz ranges and are readily extended to ranges in the hundreds of MHz.

To accommodate these higher repetition rates, certain embodiments discussed herein include ultrafast phased array steering with fully fiber-coupled optics techniques that increase steering speed capabilities of laser beam position systems to rates exceeding 1 GHz. Due to this much higher bandwidth, this approach enables steering within the duration of the laser pulse itself (i.e. intra-pulse beam steering) for laser pulse durations exceeding of about 1 ns. Hence, small and two-dimensional features may be processed on the work surface by ultrafast steering of a single pulse, rather than through placing multiple discrete pulses serially in the desired pattern. Due to the very high work surface speed, the laser material interaction—in particular with respect to the hydrodynamic aspects of it—may be tailored in a way not be readily achievable with the placement of serial pulses delivered at slower repetition rates or with longer pulse widths.

One example of such system employing phased array steering and fully fiber-coupled optics is described with reference to FIG. 8. Initially, however, phased array steering and fully fiber-coupled optics embodiments are introduced with reference to FIGS. 1-7. Lastly, with reference to FIGS. 9-12, embodiments are described for achieving relative deflection efficiency correction with up to gigahertz bandwidth using phased array steering with fully fiber-coupled optics techniques.

Phased array steering is an established technology at relatively longer electro-magnetic wavelengths and, therefore, is commonly used in, for example, radar. Conceptually, phased array steering principles can also be applied to relatively shorter optical wavelengths—in particular, infrared, visible, and UV wavelengths—commonly used in the high-power laser micromachining domain.

McManamon et al. describe the physics behind phased array steering in a paper titled, "A Review of Phased Array Steering for Narrow-Band Electrooptical Systems," Proceedings of the IEEE, vol. 97, no. 6, pp. 1078-96 (2009). In general, phased array steering is based on laser beam propagation being perpendicular to its wave front. Accordingly, a steered wave front may be established from a number of individual, densely packed phase-locked emitter beams (so-called beamlets) by using a phase modulator array that delays some beamlets and not others, which are then (re-) combined to develop the shaped (steered) wave front. This effectively tilts the wave front because some portions of the front are delayed, and thereby steers the resulting combined beam. Current phase modulators have bandwidths of greater than 1 GHz, which is several orders of magnitude faster than AODs, thereby providing the next level in the bandwidth hierarchy for compound beam positioning systems.

A fully integrated on-chip version of an electrooptical phased array steering system including a laser, a pre-amplifier, and a phase modulator array for phased array steering has been described by Doylend et al., in a paper titled, "Hybrid III/IV silicon photonic source with integrated 1D free-space beam steering," Optics Letters, vol. 37, no. 20, pp. 4257-59 (2012). This system, however, operates at relatively low laser powers.

Micromachining typically relies on higher average and peak powers than can be handled by a phase modulator array. Higher powers are achieved by providing phase modulation prior to the amplification stage of the laser. Given that the phase modulation actually steers the beam, if the steered beam is allowed to propagate as the coherent sum of its beamlets, amplification after phase modulation is non-trivial. For example, without a large slab amplifier, the steered beam could be steered out of the high-gain amplification region. On the other hand, a large slab amplifier having a homogenous amplification region encompassing the entire width of the beam steering deflection range would be inefficient because the entire application region would need to be pumped, even though at any one time the beam is going through a fairly small portion of that region.

Figure 1:
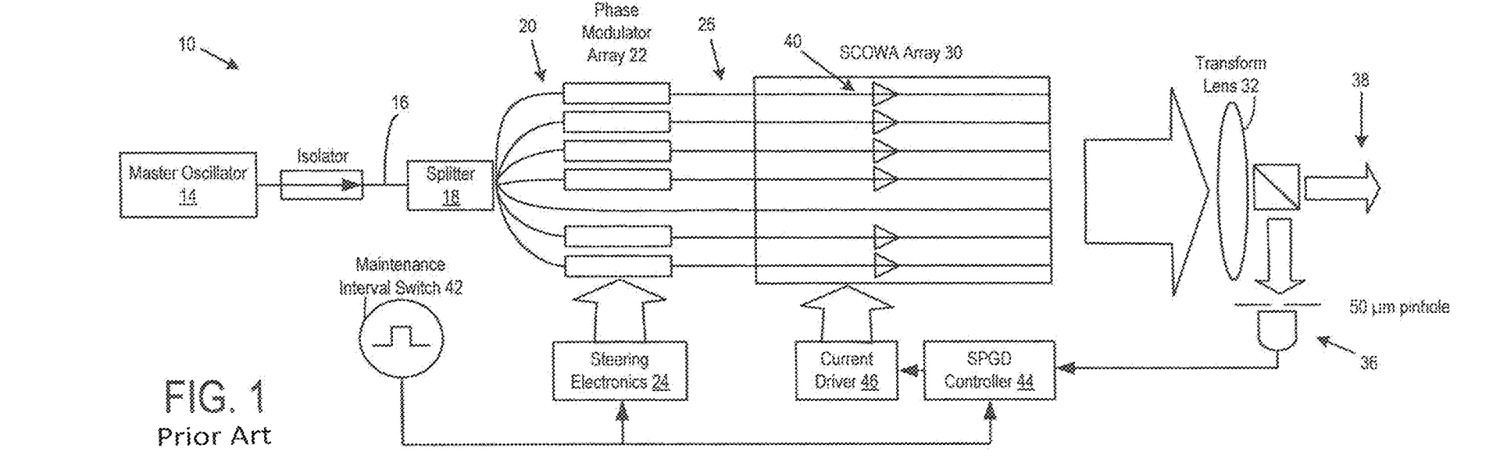
FIG. 1 is a block diagram of a one-dimensional laser beam steering system.
Figure 2:
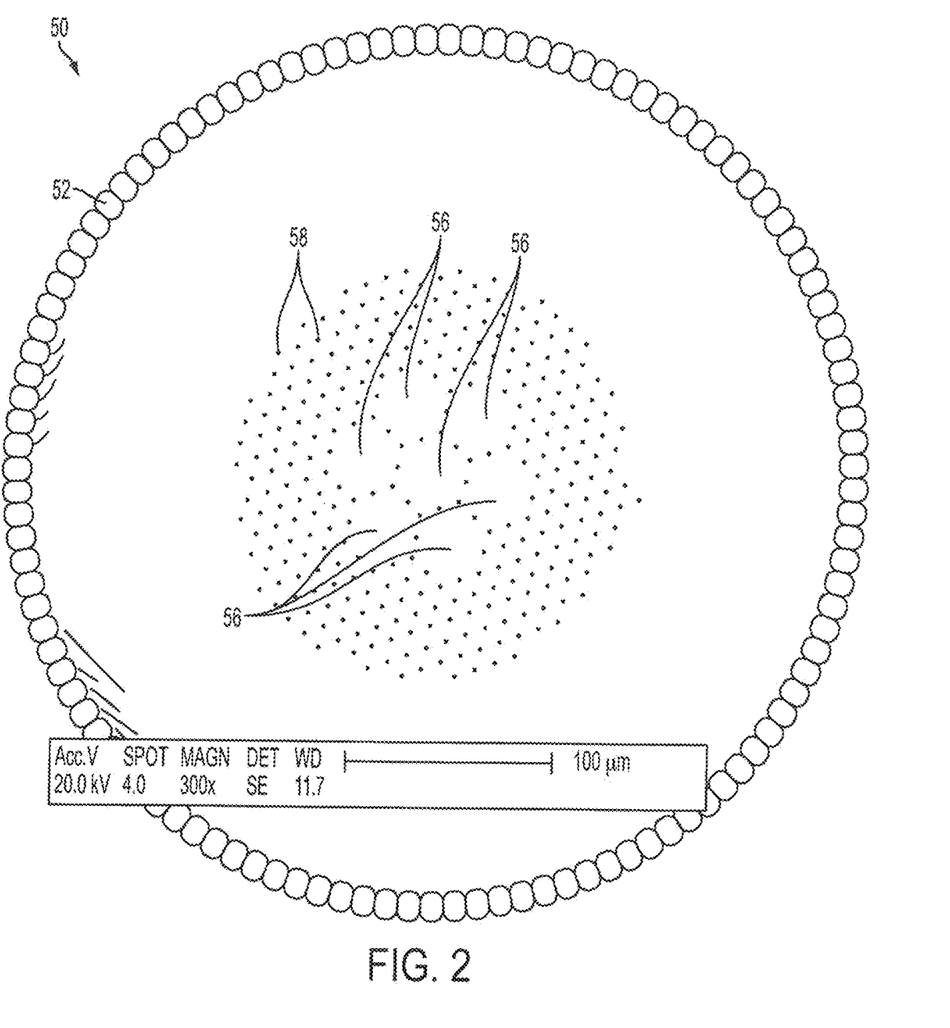
FIG. 2 is a rendering of a scanning electron microscope micrograph showing a cross-section of a multicore photonic crystal fiber.

Amplification following phase modulation has been demonstrated at Lincoln Labs of the Massachusetts Institute of Technology. In a paper titled, "High speed, high power one-dimensional beam steering from a 6-element optical phased array," Optics Express, vol. 20, no. 16, pp. 17311-18 (2012), Huang et al. describe, and FIG. 1 shows, a system 10 including a master-oscillator power-amplifier (MOPA) structure 14 producing a laser beam 16 split by a splitter 18 into un-steered beamlets 20. The beamlets 20 are individually directed to a phase modulator array 22 that is operably coupled to steering electronics 24. The electronics 24 instructs some modulators of the array 22 to delay corresponding ones of the beamlets 20, and thereby produce phased array steered beamlets 26. The beamlets 26 enter an array of slab coupled optical waveguide semiconductor amplifiers (SCOWAs) 30, are amplified through the amplification stage, are focused at a transform lens 32, and exit toward a feedback path 36 and an output path 38.

The waveguide nature of the SCOWAs 30 inhibits movement of the phased array steered beamlets 26 transiting through the SCOWAs 30. However, the phase-drift due to bulk (slab coupled) optics involved, and unique amplification characteristics of individual discrete amplifiers 40 among the SCOWAs 30 leads to regular maintenance intervals during which a maintenance interval switch 42 temporarily disables phased array steering operations and activates a stochastic parallel gradient decent (SPGD) controller 44 algorithm to perform maintenance adjustments to a current driver 46.

Maintenance re-establishes (e.g., calibrates) the phase relationship between the beamlets 26 at the exit of the SCOWAs 30. The time interval during active phase-locked compensation rephasing maintenance operations slows the micromachining process. In the published paper, the operational duty cycle for the system 10 was 66%. While this duty cycle could be improved, the discrete amplifiers 40 would still create substantial differential phase drifts over time.

To obtain a reduction in differential phase drifts attributable to a bulk amplifier, a multicore photonic crystal fiber (MC-PCF) 50 (cross-sectionally illustrated in FIG. 2) can provide either a passive phase-locked amplification or an actively phase-locked amplification. The MC-PCF 50 includes peripheral air capillaries 52 that trap pump-source energy (not shown) in the MC-PCF 50, seven Ytterbium-doped cores 56, and relatively small air capillaries 58 that inhibit diffraction energy loss of low- or high-beamlet energies 60,62 (FIGS. 3-6) transmitted through the cores 56, but still allow pump-source energy to freely migrate and thereby amplify the transmitted beamlet energies 60,62.

Figure 3:
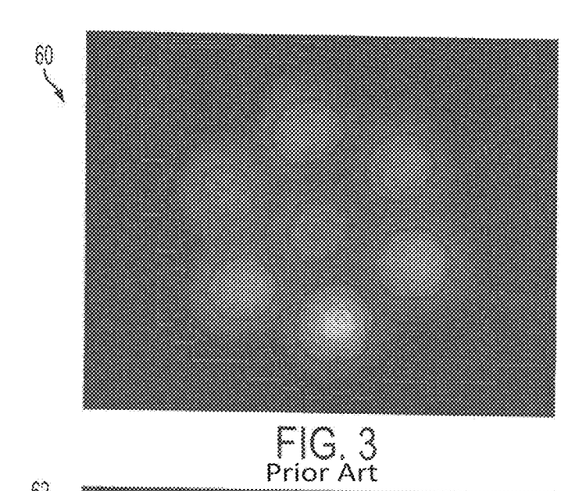
FIGS. 3, 4, 5 and 6 are renderings of two pairs of beam profile transmitted by the multicore photonic crystal fiber of FIG. 2, with each pair including a near- and far-field rendering.
Figure 4:
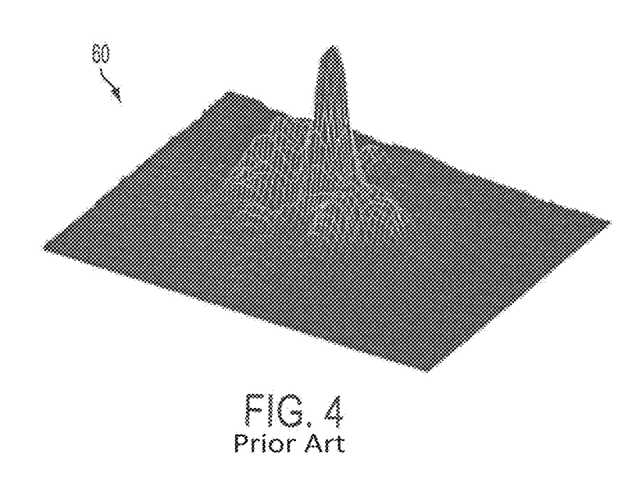
Figure 5:
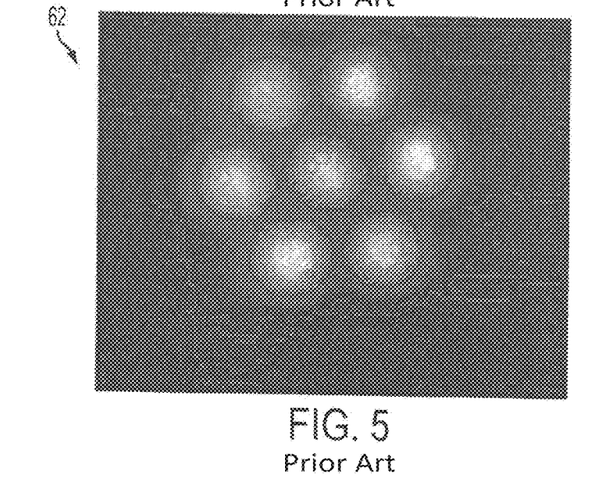
Figure 6:
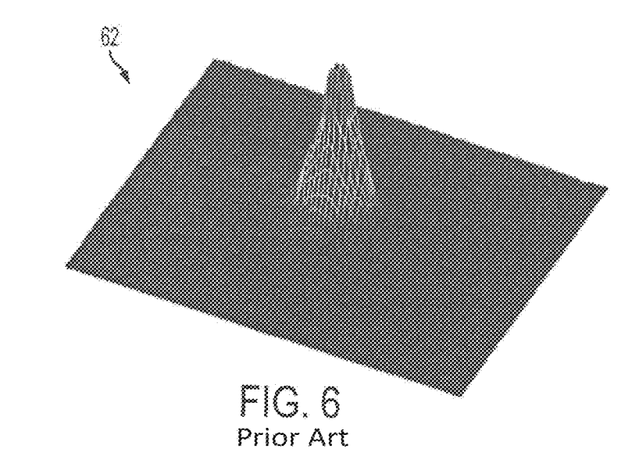

In a paper titled, "Generation of 150 MW, 110 fs pulses by phase-locked amplification in multicore photonic crystal fiber," Optics Letters, vol. 35, no. 14, pp. 2326-28 (2010), Fang et al. describe use of a MC-PCF in the context of scaling the effective mode-area in photonic crystal fibers to enable higher peak powers. The paper describes, and FIGS. 3-6 show, use of an MC-PCF that has evanescently coupled cores enabling passive phase-locking between cores. For example, FIGS. 3 and 4 are respective near- and far-field beam profile views of MC-PCF output produced at a pump power of 20 W, showing no passive phase-locking; whereas FIGS. 5 and 6 show passive phase-locking produced at a pump power of 60 W. In other words, FIG. 3 shows the phase between cores is random, thereby producing noise in the beam profile of FIG. 4; whereas FIG. 5 shows the phase is stable, yielding a clean Gaussian beam profile of FIG. 6.

The passive phase-locking shown in FIGS. 5 and 6 reduces resources spent on active phase-stabilization. Further, an MC-PCF has an inherently high packing density, which means that there are relatively small distances (and performance differences) between the effective emitters of light. The high packing density maintains a high ratio of energy contained in the central lobe in the far field compared to that of the side lobes.

Figure 7:
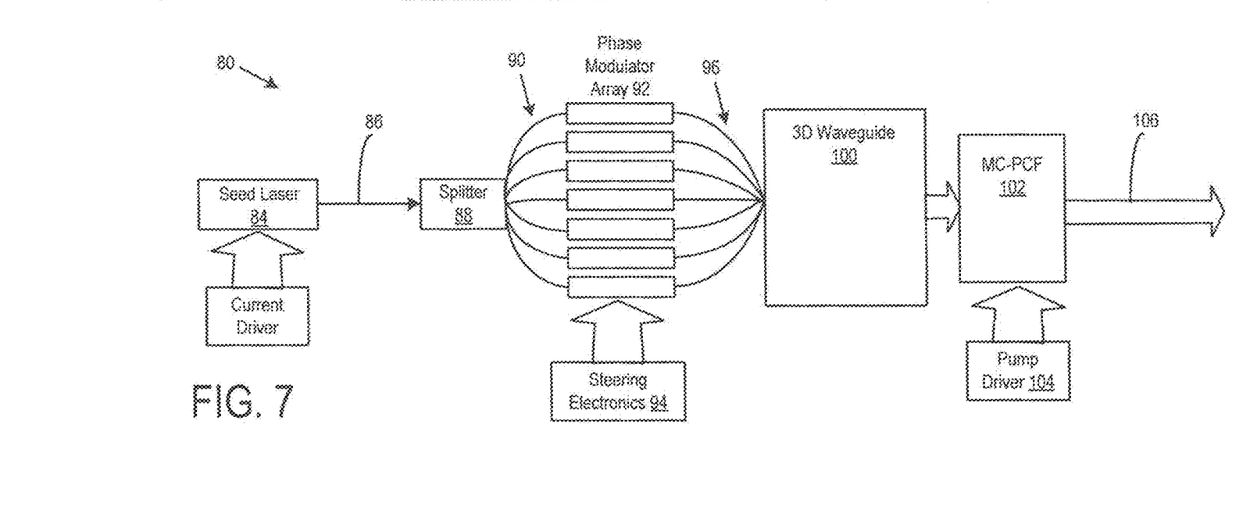
FIG. 7 is a block diagram of the hardware architecture of an embodiment of the disclosed fiber-coupled optics laser beam steering system.

FIG. 7 shows a fiber-coupled optics laser beam steering system 80 having amplification following phase modulation by use of a fully fiber-coupled optics waveguide and MC-PCF amplifier, according to an embodiment of the present disclosure.

A seed laser 84 generates variable (e.g., through a Mach Zehnder Interferometer with 1 GHz bandwidth), low power laser pulses 86 having femtosecond, picosecond, or nanosecond pulse width durations and pulse repetition rates in the range from 1 kHz to 1 Ghz. Nanosecond pulse timing allows changing of the variable intensity according to a one nanosecond period, as discussed with reference to FIGS. 9-12. The seed laser 84 could be any low power laser, but one embodiment includes a PyroPhotonics 2 W laser available from the assignee of the present disclosure, Electro Scientific Industries of Portland, Oreg.

A splitter 88, available from Jenoptik of Jena, Germany, splits laser pulses 86 into several beamlets 90. The beamlets 90 are individually directed to a phase modulator array 92 that is operably coupled to steering electronics 94, which is similar to that of the system 10.

The phase modulator array 92 may be a single array device having multiple inputs and outputs, or an array constructed of several individual (discrete) modulators available from Jenoptik. Another embodiment uses NIR-MPX-LN-05 modulators available from Photline of Besancon, France. The speed at which a laser can be phased array steered is contingent on the speed of the phase modulators. The aforementioned modulators currently have bandwidths exceeding 1 GHz, which are several orders of magnitude faster than the fastest mechanical, galvo, or AOD/EOD laser processing beam steering technology currently available.

The phase modulator array 92 produces phase differences between the beamlets 96 as the beamlets 96 move through the array 92 toward a three-dimensional, single mode waveguide 100. A suitable waveguide is available from Opto-Scribe of Livingston, United Kingdom. The waveguide 100 is fiber-coupled between the array 92 and a MC-PCF 102 having a range of 7 to 21 cores (not shown). The MC-PCF 102 includes multicore fibers (or a multicore photonic fiber rod) pumped by a pump driver 104, as described previously with reference to FIGS. 2-6. Multicore fibers are being developed for the telecom industry by, for example, NTT Communications of Tokyo, Japan. There are also the following companies capable of creating multicore photonic crystal fiber rods: NKT Photonics A/S of Birkerød, Denmark; Photonics Bretagne of Lannion, France; and INO of Quèbec, Canada.

The fully fiber-spliced beam path of the system 80 provides a steered beam 106 with high gain, and high average and peak power compatibility. The tightly packed, amplifier cores of the MC-PCF 102 reduce relative phase drifts of the MC-PCF 102 amplifier. The fully fiber-coupled system 80 has no free space optics and is, therefore, more stable when compared to the system 10.

Phased array steering techniques need not replace AODs or any other tertiary beam steering technology—though technologically speaking its performance capabilities and properties are fundamentally scaleable to replace or supplement existing beam positioning systems. As part of an existing laser beam positioning system, however, phased array steering could be incorporated as a fourth (quaternary) stage of beam steering component providing an enhanced, next layer of beam steering bandwidth.

Figure 8:
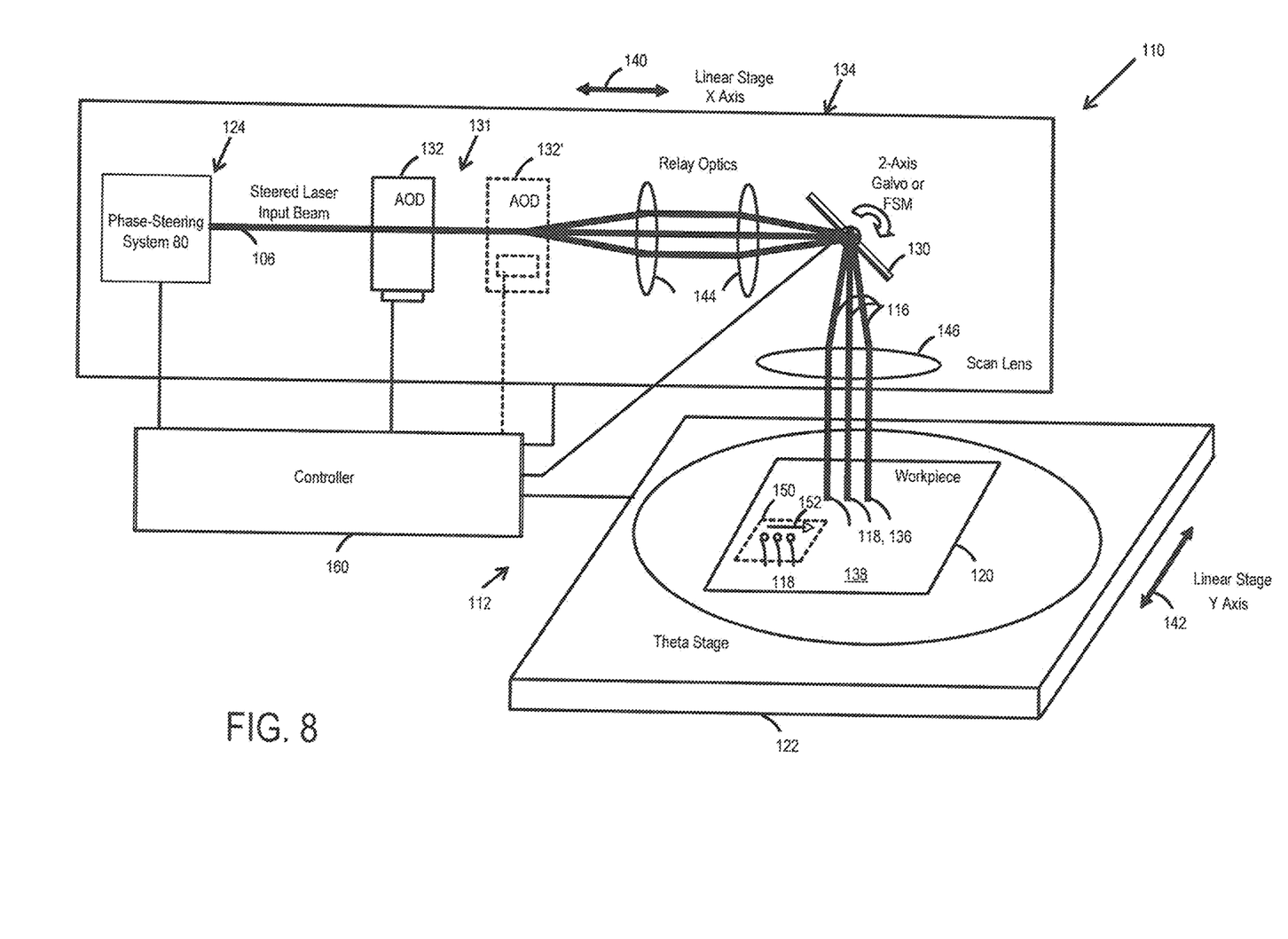
FIG. 8 is a block diagram of the hardware architecture of an embodiment of the disclosed laser beam positioning system.
Figure 9:
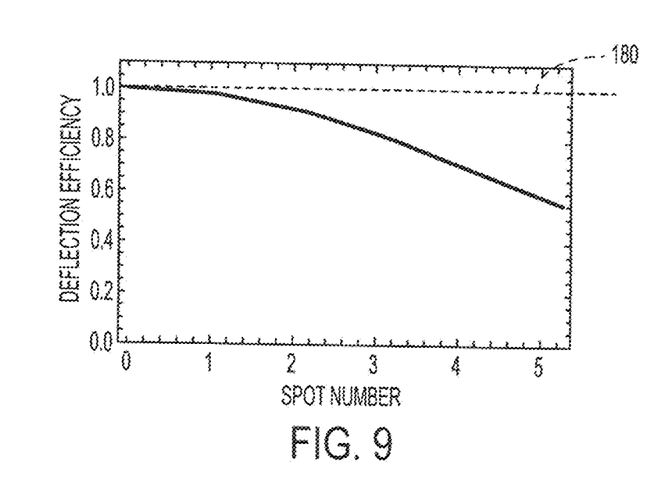
FIGS. 9, 10, 11, and 12 are plots of relative deflection efficiency versus deflection position for the laser beam positioning system of FIG. 8, showing dashed lines indicating effects of gigahertz amplitude modulation for flattening the beam intensity across a phased array steering scan field.
Figure 10:
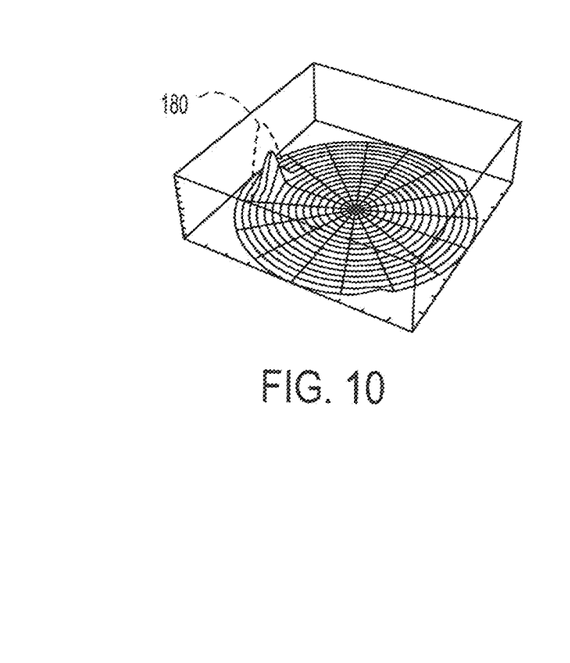
Figure 11:
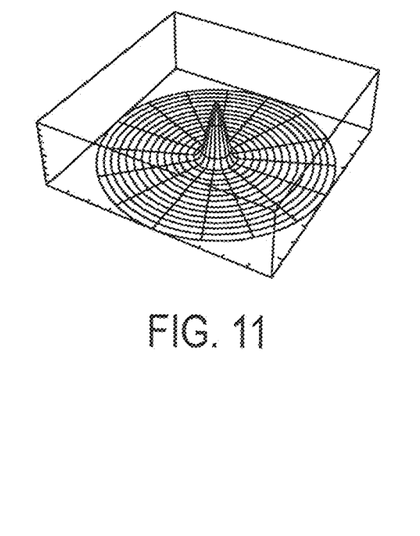
Figure 12:
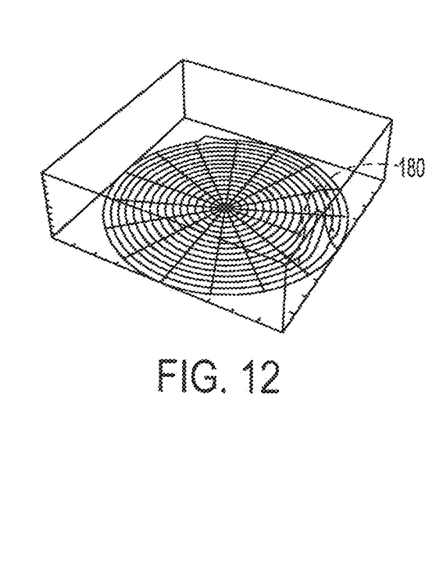

FIG. 8 shows hardware architecture of a laser beam positioning system 110 of a laser-based specimen processing system 112, according to one embodiment. The beam positioning system 110 produces from the system 80 the phased array steered laser input beam 106, and directs it to form a processing laser beam 116 that processes target features 118 (e.g., vias) of a workpiece 120 mounted on a support 122.

The beam positioning system 110 includes a beam steering stage 124 having the system 80, a mirror-based beam positioner 130, a zero-inertia optical deflector stage 131 having a zero-inertia optical deflector 132 (e.g., an AOD), and a movable stage 134 to direct the processing beam 116 to process the target features 118 at a target feature location 136 on a process surface 138 of the workpiece 120. These four stages have the following characteristics.

The primary movable stage 134 has about 100 Hz of bandwidth and a beam deflection range that is (theoretically) unlimited in the number of spots. Though some stages are characterized in terms of deflection, movable stages, for example, move a beam and do not, strictly speaking, deflect beams. The movable stage 134 supports the galvanometer head 130, the AOD 132, and the system 80, and is part of an assembly that imparts to the movable stage 134 displacements in a direction 140 along an X-axis and in a direction 142 along a Y-axis.

The secondary (galvo) mirror-based beam positioner stage 130 has about 2.5 kHz of bandwidth. Its deflection range is on the order of about 1,000 spots (or greater) across one scanning axis. Thus, its deflection area, in terms of spots squared, is about 1,000 spots (or greater)×1,000 spots (or greater). The mirror-based beam positioner 130 may be a two-axis fast steering mirror (FSM) or a two-axis galvanometer beam positioner head, the latter of which is used in the embodiments described. A suitable example FSM is a PI 5330 piezo tip/tilt platform, which is available from Physik Instrumente GmbH & Co. KG of Karlsruhe/Palmbach, Germany. A suitable galvanometer is a 6230 H galvanometer, which is available from Cambridge Technology, Inc. of Lexington, Mass.

The tertiary zero-inertia optical deflector stage 131 has a bandwidth in the range of 100 kHz-1 MHz and a deflection area of about 10-100× about 10-100 spots. A suitable example AOD is a Neos 45100-5-6.5 DEG-.51 one-dimensional deflector, which is available from Neos Technologies, Inc. of Melbourne, Fla.

The quaternary phased array steering stage 124 has a bandwidth exceeding 1 GHz, and a deflection area of 7-19 spots. This area—or scan field—of spots is dependent on the number of phase modulators/amplifier cores available in the system 80. Though currently relatively expensive, the number of phase modulators can be theoretically unlimited, which demonstrates that phased array steering could replace slower stages.

The system 110 includes additional components. For example, conventional relay lens components 144 are positioned to condition the steered beam 106 after it is deflected by the AOD 132 and before it is incident on the galvanometer head 130. The relay lens 144 translates the "pivot point" of the steered beam 106 propagating from the AOD 132 to the scan mirror surface of the galvanometer head 130. The relay lens 144 is optional, depending on the angular deflection range of the AOD 132 and the beam path length. The purpose of the relay lens 144 is to reduce deflection of the beam impinging on the galvanometer scan mirror. The beam should impinge on the center of the galvanometer scan mirror to inhibit spot distortion and scan field distortion when the beam is not centered. Another similar relay lens system could be placed between the phased array steering system 80 and the AOD 132.

A scan lens 146 is positioned to condition the processing beam 116 after it is deflected by the galvanometer head 130 and before it is incident on the process surface 138 of the workpiece 120.

The galvanometer head 130 is characterized by X-Y displacement limits that define a scan field region 150 of the process surface 138 covered by the process beam 116. The scan field region 150 is of a size that ranges between 1 mm and 50 mm along each axial dimension. The AOD 132, in response to applied RF power, deflects the steered beam 106 to move the processing beam 116 along one axis (i.e., X-axis) to process the multiple target features 118 located along a processing band 152 within the scan field region 150. The movable stage 134 slews the scan field region 150 over the process surface 138 in its entirety to process all the target features 118 of the workpiece 120.

A controller 160 coordinates the operations of the system 80, the AOD 132, the galvanometer head 130, and the movable stage 134. Thus, the beam positioning system 110 operates to form the vias 118 by moving the processing beam 116 in accordance with the following beam positioning sequence that is coordinated by the controller 160.

Initially, the system 80 steers the beam 106 and the AOD 132 deflects the steered beam 106 so that the processing beam 116 moves in the X-axis direction 140 to process along the processing band 152, in the form of a line of action (LOA) 152, a line of the vias 118 at the via locations 136. The processing beam 116 dwells at each one of the via locations 136 for a time that is sufficient to drill the via 118 preferably by punching with a small number (e.g., 1-5) of laser pulses.

Upon completion of drilling a line of the vias 118 along the LOA 152, the galvanometer head 130 positions the LOA 152 of the processing beam 116 to repeat the beam deflection operations of the system 80 and the AOD 132 to drill an adjacent line of the vias 118 at the via locations 136 in the scan field region 150. The positioning of the LOA 152 and the drilling of a line of the vias 118 is repeated until completion of the drilling of all lines of the vias 118 encompassed by the scan field region 150. The movable stage 134 slews the scan field region 150 over the process surface 138 to cover the undrilled via locations 136 and enable drilling of them by the processing laser 116 in response to beam deflection from either the system 80, the AOD 132, or both. Additional beam positioning sequence operations are described in U.S. Pat. No. 8,680,430, assigned to Electro Scientific Industries, Inc., which is also the assignee of the present disclosure.

In an alternative implementation, controller 160 can coordinate the movements of movable stage 134 and galvanometer head 130 to maintain LOA 152 at a constant location on process surface 138, even as movable stage 134 is in motion. Such operation is accomplished by compound beam positioner systems described in U.S. Pat. Nos. 5,798,927 and 5,751,585, both of which are assigned to Electro Scientific Industries, Inc.

The phased array steering operation of the system 80 rapidly positions the processing beam 116 to the next adjacent via location 136 and thereby effectively eliminates move time between the via locations 136 and along the LOA 152, while allowing the processing laser beam 116 to dwell at each via location 136 for processing. This move-and-dwell capability allows the AOD 132 and the galvanometer head 130 to pause or slow positioning of the scan field region 150 while processing the via locations 136.

FIGS. 9-12 show, for an example phased array steering system design, spot size efficiency versus deflection plots across the scan field of the example system. The plots show that as beam deflection is increased by a phased array steering system, the steered beam loses energy and becomes less efficient at micromachining. To maintain constant energy at the work surface across the scan field of the phased array steering system, a seed laser output power is modulated according to deflection range, and synchronously (contemporaneously) with the deflection control, to compensate for the variation in the deflection efficiency. This inter- or intra-pulse amplitude modulation is performed at the same 1 GHz bandwidth as that of the phase modulator array 92. Therefore, inter- and intra-pulse amplitude modulation can be synchronized with phased array steering so that pulses delivered at up to 1 GHz are amplitude modulated according to the amount of deflection, thereby compensating for loss in efficiency attributable to high deflection. Dashed lines 180 indicate delivery of an improved amplitude modulated pulse.

Phased array steering provides the capability to perform beam shaping in addition to steering. For example, instead of using a linear phase delay profile for controlling modulators of array 92, a parabolic phase delay profile can be used for focusing or defocusing a spot. But in principle, any type of wave front can be generated within the spatial resolution given by the number of phase modulators and packing density of cores in a MC-PCF, which means that some wave front distortion compensation as well as some beam shaping is within the scope of this disclosure. These techniques can be extended to intra-pulse beam shaping for pulse width durations that are (currently) greater than 1 ns. With intra-pulse beam shaping, the beginning of the pulse is focused at one region and the end of the pulse is focused in another region.

Advantages of the beam positioning system 110 include the following. The beam positioning system 110 provides high-throughput processing of the regularly spaced workpiece features 118, while minimizing the degradation of accuracy and workpiece feature quality that result from dynamic and thermal loads on the beam positioning and optical components. The beam positioning system 110 can achieve 1 GHz bandwidths, as well as beam steering and shaping. Beam steering and shaping can provide inter- or intra-pulse laser focusing, thereby eliminating additional system components.

It will be understood to skilled persons that many changes may be made to the details of the above-described embodiments without departing from the underlying principles of the invention. The scope of the present invention should, therefore, be determined only by the following claims.

What is claimed is:

1. A method, comprising:
providing a beam positioning system including:
a first beam positioner having a first response time and operable to position a processing laser beam within a scan field region, and
a second beam positioner including a phase modulator array having a second response time and operable to generate a plurality of beamlets of laser energy and produce phase differences between the beamlets to produce a steered input laser beam that is deliverable to the first beam positioner as the processing laser beam, the second response time being shorter than the first response time, wherein the phase modulator array is operably coupled to steering electronics configured to command some modulators of the phase modulator array to delay corresponding ones of the beamlets to produce the steered input beam; and
directing the processing laser beam for incidence on a surface of a workpiece, wherein the directing includes:
phased array steering the steered input laser beam with the phase modulator array and amplitude modulating the plurality of beamlets based on the phased array steering of the steered input laser beam;
delivering the steered input laser beam to the first beam positioner; and
directing the steered input laser beam from the first beam positioner to the workpiece.

2. The method of claim 1, in which the beam positioning system includes a third beam positioner including a zero-inertia optical deflector.

3. The method of claim 1, in which the second beam positioner includes a seed laser and a pulse amplitude controller controlling the seed laser to amplify the steered input laser beam, wherein amplitude modulating the plurality of beamlets includes controlling the seed laser to amplify the steered input laser beam.

4. The method of claim 1, in which the second beam positioner is a fiber-coupled optics system including a three-dimensional waveguide receiving beamlets from the phase modulator array and delivering them to a multicore photonic crystal fiber or rod.

5. A method for phased array modulation of a laser beam, comprising:
generating a beam of laser pulses using a seed laser source;
splitting the beam of laser pulses into a plurality of beamlets;
producing, within a phase modulator array, phase differences between the beamlets;
amplifying the beamlets output by the phase modulator, thereby producing an amplified laser beam, wherein producing phase differences between the beamlets comprises controlling an operation of the phase modulator array to steer the amplified laser beam; and
modulating, in synchrony with the operation of the phase modulator array, an output power of the seed laser source according to the amount of deflection imparted by the phase modulator array, to compensate for a variation in beam efficiency caused by the deflection.

6. A method for phased array modulation of a laser beam, comprising:
generating a beam of laser pulses using a seed laser source;
splitting the beam of laser pulses into a plurality of beamlets;
within a phase modulator array, phase-modulating the plurality of beamlets to produce phase differences between the beamlets, wherein phase-modulating the plurality of beamlets to produce phase differences between the beamlets comprises operating steering electronics operably coupled to phase modulator array to command some modulators of the phase modulator array to delay corresponding ones of the beamlets;
propagating the phase-modulated plurality of beamlets from the phase modulator array to a common amplifier; and
within the amplifier, amplifying the phase-modulated plurality of beamlets, thereby producing an amplified laser beam,
wherein producing phase differences between the beamlets comprises controlling an operation of the phase modulator array to produce phase differences between the beamlets in a manner that changes a wave front of laser pulses in the amplified laser beam such that the wavefront of laser pulses in the amplified laser beam changes at least once.

7. A method for phased array modulation of a laser beam, comprising:
generating a beam of laser pulses using a seed laser source;
splitting the beam of laser pulses into a plurality of beamlets;
within a phase modulator array, phase-modulating the plurality of beamlets to produce phase differences between the beamlets, wherein phase-modulating the plurality of beamlets to produce phase differences between the beamlets comprises operating steering electronics operably coupled to phase modulator array to command some modulators of the phase modulator array to delay corresponding ones of the beamlets;
propagating the phase-modulated plurality of beamlets from the phase modulator array to a common amplifier; and
within the amplifier, amplifying the phase-modulated plurality of beamlets, thereby producing an amplified laser beam,
wherein producing phase differences between the beamlets comprises controlling an operation of the phase modulator array to produce phase differences between the beamlets in a manner that defocuses the amplified laser beam.

8. The method of claim 5, wherein generating the beam of laser pulses comprises generating a beam of laser pulses having a pulse width greater than 1 ns.

9. The method of claim 8, wherein generating the beam of laser pulses comprises generating the beam of laser pulses at a pulse repetition rate in a range from 1 kHz to 1 GHz.

10. The method of claim 1, wherein the phase modulator array is further operable to produce phase differences between the beamlets to shape the steered input laser beam.

11. The method of claim 5, wherein amplifying the beamlets output by the phase modulator array comprises amplifying the beamlets within a multicore photonic crystal fiber.

12. The method of claim 11, wherein the multicore photonic crystal fiber amplifier includes a plurality of cores which and, during amplification of the beamlets output by the phase modulator array, evanescently coupling the plurality of cores.

13. The method of claim 6, wherein producing phase differences between the beamlets comprises controlling an operation of the phase modulator array to produce phase differences between the beamlets in a manner that steers the amplified laser beam.

* * * * *